United States Patent
Iida et al.

(10) Patent No.: US 7,011,182 B2
(45) Date of Patent: Mar. 14, 2006

(54) AXLE DRIVING APPARATUS

(76) Inventors: Masaru Iida, 18-1, Inadera 2-chome, Amagasaki-shi, Hyogo (JP) 661-0981; Hiroaki Shimizu, 18-1, Inadera 2-chome, Amagasaki-shi, Hyogo (JP) 661-0981

( * ) Notice: Subject to any disclaimer, the term of this patent is extended or adjusted under 35 U.S.C. 154(b) by 32 days.

(21) Appl. No.: 10/615,913

(22) Filed: Jul. 10, 2003

(65) Prior Publication Data

US 2004/0104064 A1   Jun. 3, 2004

Related U.S. Application Data

(63) Continuation of application No. 10/116,062, filed on Apr. 5, 2002, now Pat. No. 6,622,825, which is a continuation of application No. 09/555,764, filed on Jun. 5, 2000, now Pat. No. 6,401,869.

(51) Int. Cl.
*F01M 1/00* (2006.01)
(52) U.S. Cl. .................. 184/6.12; 56/320.2; 56/202
(58) Field of Classification Search .............. 184/6.25, 184/6.12; 74/607, 606 R; 210/168, 222, 210/223; 56/320.1, 320.2, 202
See application file for complete search history.

(56) References Cited

U.S. PATENT DOCUMENTS

| | | | |
|---|---|---|---|
| 4,794,942 A | 1/1989 | Yasuda et al. | |
| 5,138,825 A * | 8/1992 | Trefz et al. | 56/11.1 |
| 5,317,936 A | 6/1994 | Shiba et al. | |
| 5,476,582 A | 12/1995 | Camping | |
| 5,515,747 A | 5/1996 | Okada et al. | |
| 5,685,134 A * | 11/1997 | Thornburg | 56/12.9 |
| 5,870,889 A * | 2/1999 | Togoshi et al. | 56/320.9 |
| 5,910,091 A * | 6/1999 | Iida et al. | 56/16.7 |
| 6,038,840 A * | 3/2000 | Ishimori et al. | 56/13.3 |
| 6,158,543 A | 12/2000 | Matsuto et al. | |
| 6,189,412 B1 | 2/2001 | Tsubata et al. | |
| 6,226,970 B1 * | 5/2001 | Busboom et al. | 56/202 |
| 6,260,339 B1 | 7/2001 | Abend et al. | |
| 6,341,489 B1 | 1/2002 | Iida | |

(Continued)

FOREIGN PATENT DOCUMENTS

JP        52-70832        5/1977

(Continued)

*Primary Examiner*—David Fenstermacher
(74) *Attorney, Agent, or Firm*—Sterne, Kessler, Goldstein & Fox P.L.L.C.

(57) ABSTRACT

A housing cannot be made compact by only securing a space corresponding to a reservoir tank at the upper part of the housing, and the space at the upper part of the housing cannot be utilized if the reservoir tank is integrally provided to the upper part of the housing. An axle driving apparatus comprising a tubular reservoir tank erected on the upper surface of the upper wall surface of the housing for accommodating an HST, wherein, since the reservoir tank is thinly elongated and is freely bendable, it can be disposed in a limited space. The housing is divided into a first room and a second room with which the reservoir tank communicates. Further, a first magnet is disposed at a position where the first and second rooms are connected, and a second magnet is disposed in the proximity of an oil filter connected to a closed circuit of the HST so that impurities can be removed.

3 Claims, 10 Drawing Sheets

U.S. PATENT DOCUMENTS

| | | |
|---|---|---|
| 6,370,855 B1 * | 4/2002 | Evans et al. ............... 56/320.2 |
| 6,390,227 B1 | 5/2002 | Abend et al. |
| 6,401,869 B1 | 6/2002 | Iida et al. |
| 6,431,305 B1 * | 8/2002 | Ishimori et al. ............ 180/371 |
| 6,550,242 B1 | 4/2003 | Abend et al. |
| 6,651,427 B1 * | 11/2003 | Poplawski et al. ............ 60/436 |
| 2001/0000562 A1 | 5/2001 | Abend et al. |
| 2002/0189137 A1 * | 12/2002 | Cox et al. .................... 37/242 |
| 2003/0057009 A1 * | 3/2003 | Abend et al. ............... 180/375 |
| 2004/0152546 A1 * | 8/2004 | Johnson et al. ............... 474/33 |

FOREIGN PATENT DOCUMENTS

| | | |
|---|---|---|
| JP | 56-80215 | 6/1981 |
| JP | 64-53502 | 4/1989 |
| JP | 3-159822 | 7/1991 |
| JP | 4-8958 | 1/1992 |
| JP | 4-48454 | 4/1992 |
| JP | 5-16683 | 1/1993 |
| JP | 9-273623 | 10/1997 |
| JP | P2000-266166 A | 3/1999 |

* cited by examiner

AXLE DRIVING APPARATUS

CROSS-REFERENCE TO RELATED APLLICATIONS

This application is a continuation of U.S. application Ser. No. 10/116,062, filed Apr. 5, 2002 (now U.S. Pat. No. 6,622,825), which is a continuation of U.S. application Ser. No. 09/555,764, filed Jun. 5, 2000 (now U.S. Pat. No. 6,401,869).

BACKGROUND OF THE INVENTION

1. Field of the Invention

The present invention relates to a reservoir tank attached to an axle driving system in which a hydrostatic transmission (hereafter referred to as HST), an axle, and a drive train for connecting the HST and the axle for driving are housed in a common housing.

2. Related Art

Conventionally, a housing that houses an HST is filled with hydraulic oil that is also used as lubricating oil. A temperature of the hydraulic oil is increased by driving the HST. The increase in temperature of the hydraulic oil results in an increase in its volume. In order to receive the increase in the volume, a technique of providing a reservoir tank on an outside of the housing or forming space having a volume corresponding to the increase within the housing to form a reservoir room is known.

For example, there is a technique disclosed in U.S. Pat. No. 4,987,796 or U.S. Pat. No. 5,440,951.

However, an axle driving apparatus that utilizes a reservoir tank structure. requires additional space, a mounting member for mounting the reservoir tank, and piping for connecting the reservoir tank and the housing. In addition, the number of man-hours required for assembly increases, the reservoir tank is difficult to handle, and cost increases.

By positioning the reservoir tank at an upper portion of the housing, a vertical length of the housing increases to inhibit miniaturization of the axle driving system and an air layer is created in the housing to cause air to be swallowed in oil when the oil within the housing is stirred. If this oil is charged into a closed circuit of the HST as the hydraulic oil, volume efficiency of the HST is reduced, which may generate noise or reduce durability.

Further, it is difficult to integrally form the reservoir tank at the upper portion of the housing for a lawn tractor having a rear discharge method, because a chute passes above the axle driving system.

SUMMARY OF THE INVENTION

According to the present invention, a tubular reservoir tank is mounted to stand on an upper face of an upper wall-face of a housing that houses an HST including a hydraulic pump and a hydraulic motor. The reservoir tank communicates with an oil reservoir within the housing. Therefore, it is possible to easily mount the reservoir tank by a simple structure, to form the reservoir tank from low-priced members, and to reduce cost.

The reservoir tank is formed of a tubular member. Therefore, if there is a member such as a chute that is related to the vehicle main machine above the housing, it is possible to mount the reservoir tank by bending the reservoir tank. Therefore, it is possible to easily mount the reservoir tank by causing the reservoir tank to make way for the member that interferes with the reservoir tank, thereby increasing the number of applications in which the axle driving system may be used.

The housing is partitioned into a first room, housing the HST and a second room, housing an axle and a gear train for transmitting power from the hydraulic motor to the axle. The first and second rooms communicate with each other such that the oil with which both the rooms are filled can circulate between both the rooms. The reservoir tank is disposed on the second room. Therefore, it is possible to position a mounting portion of the reservoir tank in a high position, thereby easily purging air generated within the reservoir tank. Because the reservoir tank may be disposed in a position isolated from the pump shaft, it is possible to easily prevent the reservoir tank from interfering with a rotary member such as an input pulley or a cooling fan.

A communicating position connecting the first room and the second room allows oil to pass there between. A filter member for removing impurities included in oil is disposed in the communicating position. Therefore, it is possible to remove impurities included in the oil when the oil circulates between the first room and the second room due to the variation in volume of the respective rooms which occurs with a change in oil temperature or stirring by actuation action of the HST or rotation of a gear. The impurities can be removed by means of the filter member disposed in an oil hole for hydraulic oil of the HST, the oil within the first room can be cleaned, and durability of the HST can be further improved.

Because the filter member is formed of a magnet, the filter member can be formed at low cost and can be miniaturized. Therefore, limitations to a place where the filter member is disposed can be reduced, durability of the filter member is high, and the filter member can be cleaned easily.

A closed circuit is formed by providing an oil path to a center section to which a hydraulic pump and a hydraulic motor in the HST are mounted, an oil hole opening at the center section for supplying hydraulic oil to the closed circuit is connected to an oil filter disposed in an oil reservoir, and a magnet is disposed in the oil reservoir in a vicinity of the oil filter. Therefore, it is possible to cause the magnet to collect iron powder before it is drawn into the oil hole and to easily remove the harmful iron powder before it enters the closed circuit of the HST.

The magnet is disposed such that the magnet acts on the hydraulic oil after passing through the oil filter and before entering the oil hole. Therefore, if there is extremely fine iron powder that has passed through the oil filter, the iron powder can be collected by the magnet and prevented from entering the closed circuit of the HST, thereby increasing life of the HST. Because only small iron powder is collected by the magnet, an amount of iron powder collected by the magnet is small even after use of the magnet for a long term and frequency of maintenance can be reduced.

DETAILED DESCRIPTION OF THE PREFERRED EMBODIMENTS

Figure 1:
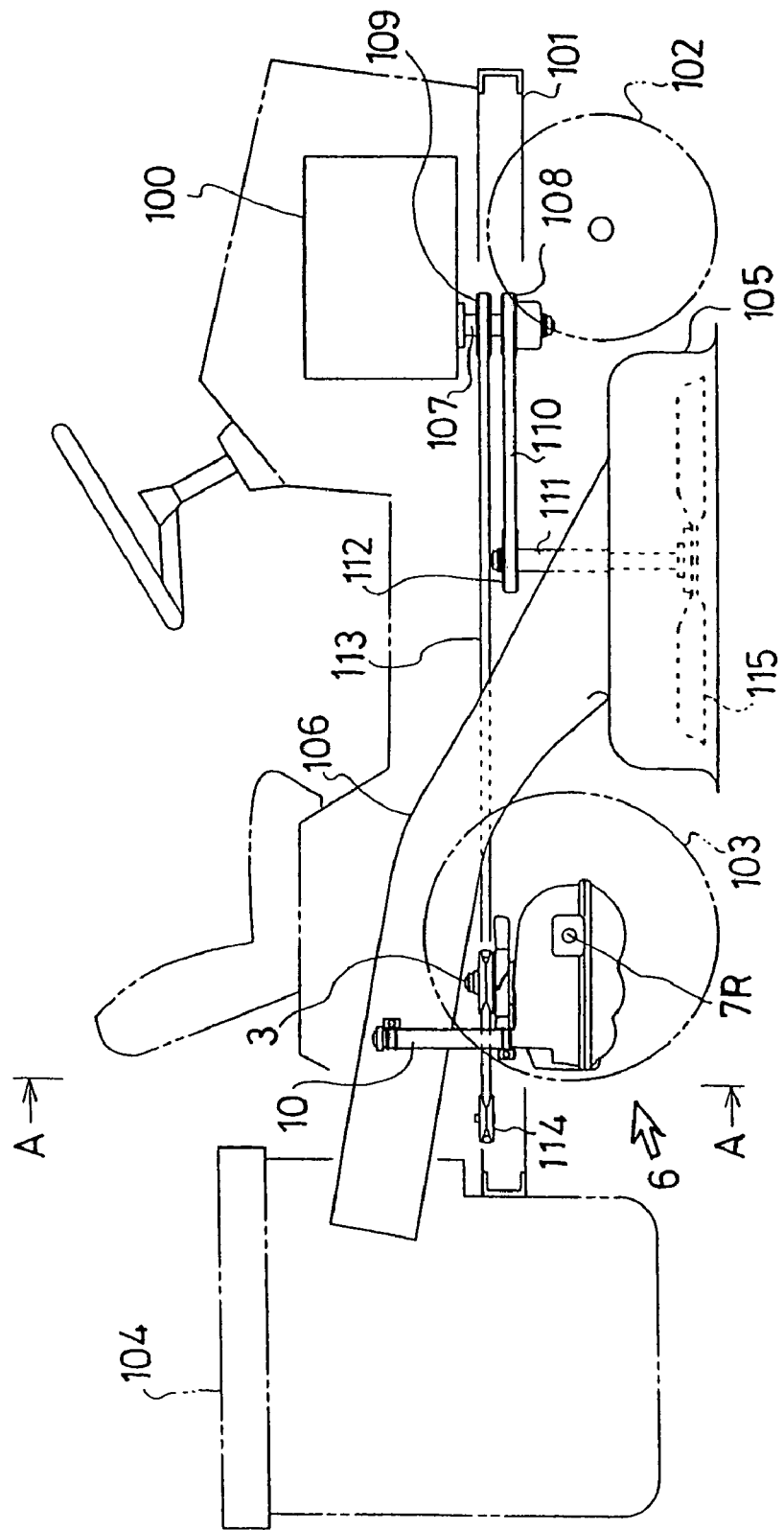
FIG. 1 is a general side view of a lawn tractor to which an axle driving system of the present invention is mounted.
Figure 2:
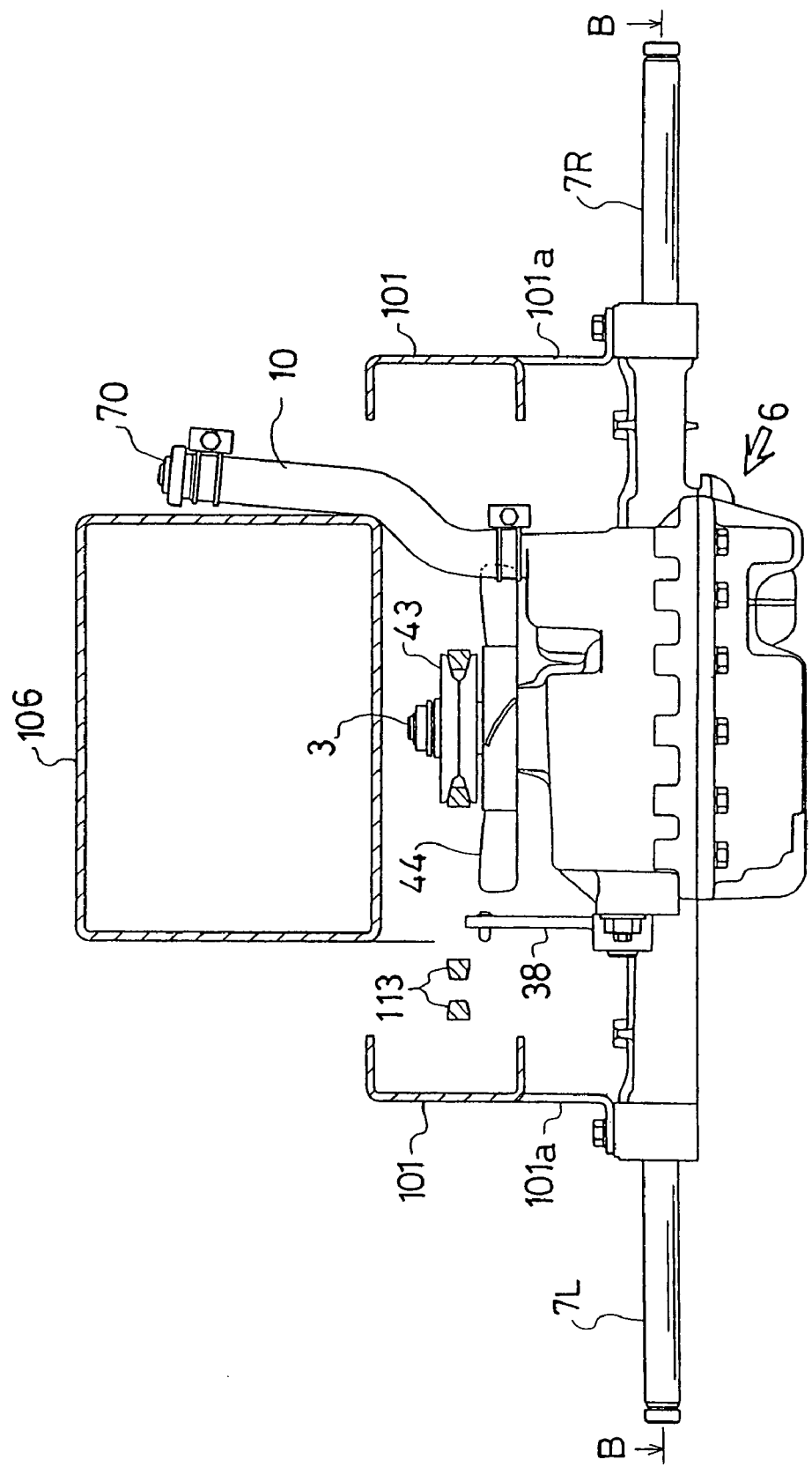
FIG. 2 is a sectional view taken in a direction of an arrow A—A in FIG. 1.
Figure 3:
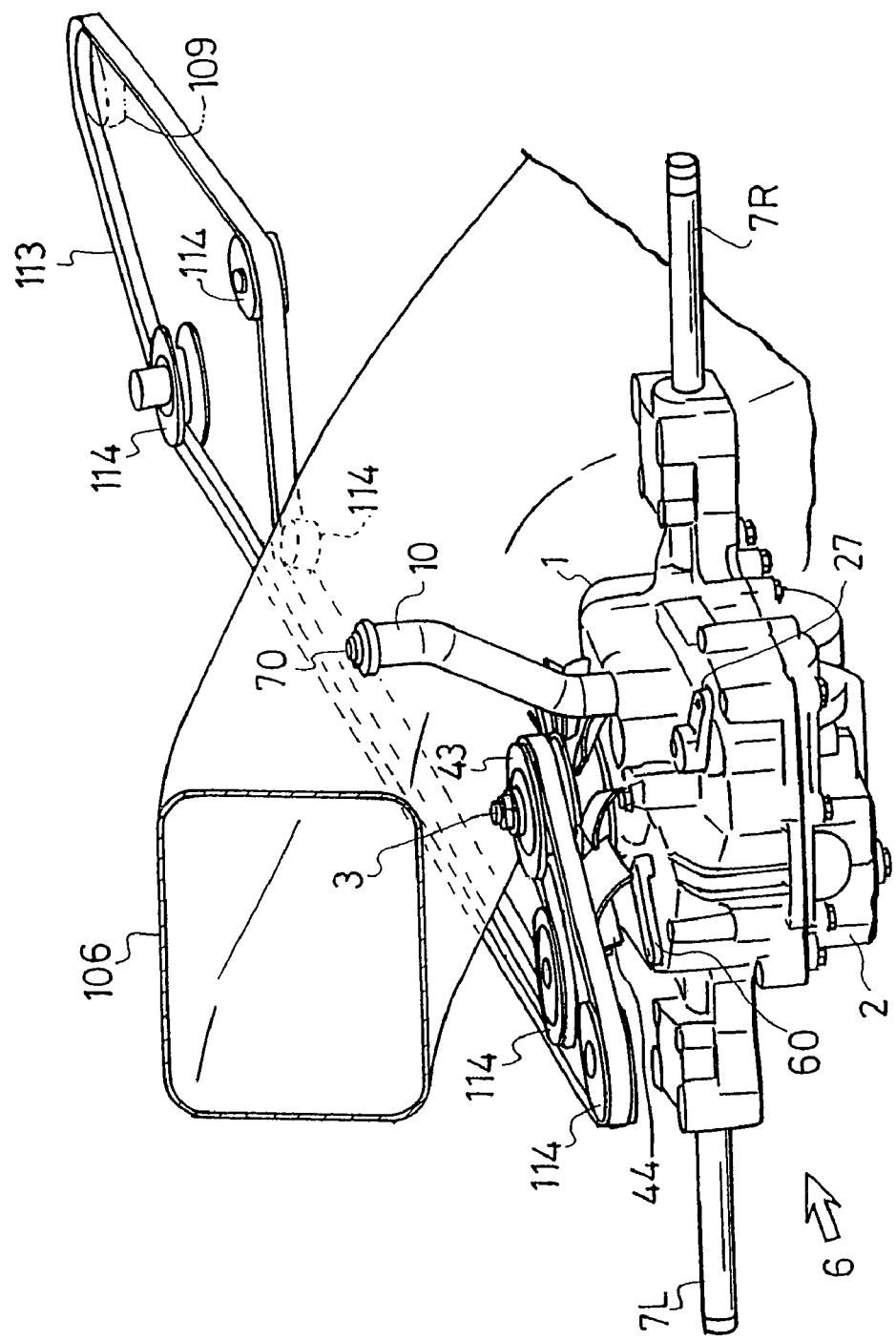
FIG. 3 is a back perspective view of an axle driving system.

In FIGS. 1, 2, and 3, a lawn tractor of a rear discharge method has a vertical crankshaft-type engine 100 disposed on a front portion of a bodywork frame 101. Steerable left and right (front) follower wheels 102, 102 are suspended from the front portion of the bodywork frame 101, an axle driving system 6 having left and right (rear) driving wheels 103, 103 is suspended from a rear portion, a grass box 104 is mounted to a rear end by a working machine mounting device (not shown) such that the grass box 104 can be hoisted and lowered, and a mower 105 is mounted to a lower portion of the bodywork between the follower wheels 102, 102 and the driving wheels 103, 103 through a hoisting and lowering mechanism (not shown). A discharge opening of the mower 105 and an entrance of the grass box 104 are connected through a chute 106. The chute 106 extends diagonally upward and rearward from an upper portion of the mower 105, passes above the axle driving system and between the left and right driving wheels 103, 103, and connects to the entrance of the grass box 104. Therefore, grass mowed by the mower 105 is blown rearward, passes through the chute 106 and between the left and right driving wheels 103, 103, and is housed in the grass box 104.

As shown in FIG. 1, two pulleys 108 and 109 are fixed onto a vertical output shaft 107 of the engine 100. The pulley 108 has an electromagnetic clutch and transmits power through a belt 110 to an input pulley 112 fixed onto an input shaft 111 of the mower 105 to drive the mower 105, thereby rotating a cutting blade 115 of the mower 105. As shown in FIG. 3, five tension pulleys 114, pivoted on the bodywork frame 101, allow a belt 113 to navigate around the chute 106. The belt 113 is attached to the other pulley 109 and an input pulley 43, which is fixed onto a pump shaft 3. Pump shaft 3 is an input shaft projecting upward from the housing of the axle driving system 6. A reference numeral 44 designates a cooling fan for cooling the axle driving system and fixed to a lower face of the input pulley 43 on the pump shaft 3.

As shown in FIG. 3, the axle driving system 6 is hung on left and right mount members 101a, 101a which are parts of the bodywork frame 101. Left and right axles 7L and 7R project from side faces of the housing of the axle driving system 6 and the driving wheels 103, 103 are mounted to end portions of the axles 7L and 7R.

Next, in FIGS. 4 to 8, a general structure of the axle driving system 6 will be described. The housing of the axle driving system 6 is formed of two housing members, i.e., an upper housing 1 and a lower housing 2, which are joined to each other at their flat and peripheral joint faces in a horizontal plane. At the joint face of the housing, bearing portions of a motor shaft 4 and a counter shaft 26 are provided. The axles 7L and 7R are disposed in parallel with the joint face of the housing. The bearing portions of the axles 7L and 7R are displaced upward from the joint face and disposed within the upper housing 1 to rotatably support the axles 7L and 7R. The respective axles 7L and 7R are connected in a differential manner by a differential gear 23 and opposite ends of the axles 7L and 7R project outward from left and right outer walls of the housing.

An inside of the housing is partitioned by an inner wall 8 into a first room R1 for housing the HST and a second room R2 for housing a drive train. The drive train is formed of a plurality of gears for transmitting power from the motor shaft 4 to the differential gear 23 and the axles 7L and 7R. The inner wall 8 is formed of a portion extending along and in parallel with a longitudinal direction of the axles 7L and 7R and a portion extending in a direction perpendicular to the longitudinal direction. These portions are formed seamlessly and the first room R1 is adjacent to the second room R2. The inner wall 8 is formed of a wall portion hanging from an inside of the upper housing 1 toward the joint face and a wall portion standing from an inner wall of the lower housing 2 toward the joint face. End faces of the upper and lower wall portions are placed on each other at the joint face, thereby partitioning the inside of the housing into two independent rooms.

Figure 4:
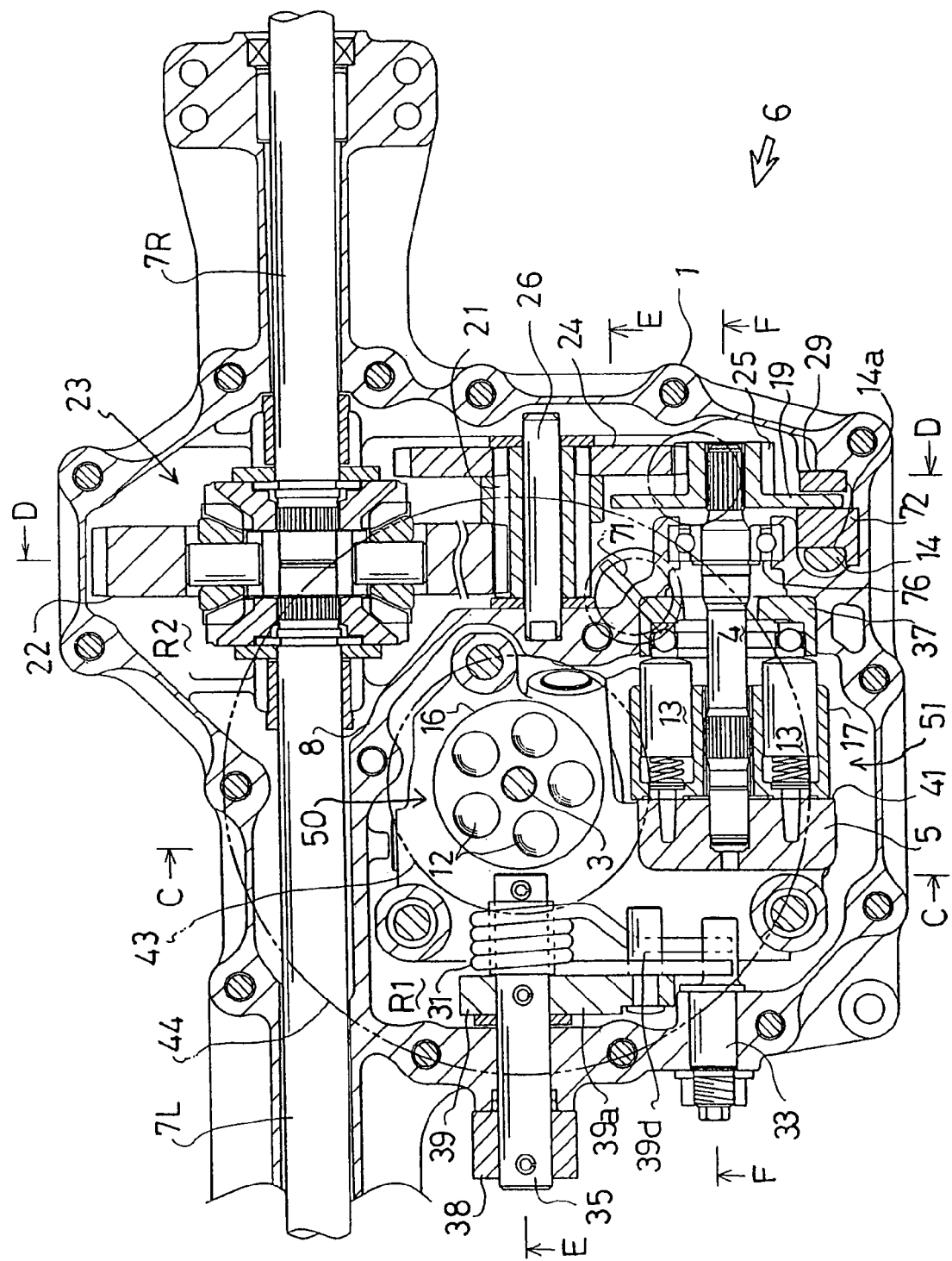
FIG. 4 is a sectional view taken in a direction of an arrow B—B in FIG. 2.

The first room R1 is disposed at the rear of the axles 7L and 7R and on the left of a power transmission device for transmitting power from the motor shaft 4 to the differential gear 23 in the housing as shown in FIG. 4. In the first room R1, a center section 5 constituting the HST is detachably mounted to the inside of the upper housing 1. The center section 5 is disposed such that a longitudinal direction of the center section 5 is in a longitudinal direction of the bodywork and is substantially perpendicular to the axles 7L and 7R. A vertical face is formed at a rear portion of the center section 5, a motor attachment face 41 is formed on the vertical face, and a hydraulic motor 51 is disposed on the motor attachment face 41. A horizontal face is formed at a front portion of the center section 5, a pump attachment face 40 is formed on the horizontal face, and a hydraulic pump 50 is disposed on the pump attachment face 40. Therefore, the hydraulic pump 50 is disposed between the hydraulic motor 51 and the axles 7L and 7R when viewed in the longitudinal direction of the bodywork. The pump shaft 3 is vertically supported at a center of the pump attachment face 40. The pump shaft 3 extends between the hydraulic motor 51 and the axles 7L and 7R, passes through an upper wall of the upper housing 1, and projects wherein the input pulley 43 is mounted thereon.

A cylinder block 16 is disposed for rotation and sliding on the pump attachment face 40. Pistons 12, 12, are fitted for reciprocation in a plurality of cylinder bores of the cylinder block 16 through biasing springs. A thrust bearing 11a of a movable swash plate 11 is in contact with bead portions of the pistons 12, 12. An opening portion 11b is formed at a center of the movable swash plate 11 such that the pump shaft 3 can pass through the opening portion 11b. The pump shaft 3 also functions as an input shaft, is disposed on a center rotational axis of the cylinder block 16, and is locked to the cylinder block 16 such that the pump shaft 3 and the cylinder block 16 cannot rotate with respect to each other, thereby forming the hydraulic pump 50 of an axial piston type.

By inclining a piston contact face of the movable swash plate 11 through an arbitrary angle from a horizontal position with respect to the center rotational axis of the cylinder block 16, it is possible to change a discharge amount or a discharge direction of oil from the hydraulic pump 50. A back face of the movable swash plate 11 is formed into a projecting arc portion. A recessed arc portion corresponding to a shape of the projecting arc portion is formed on an inner face of an upper portion of the upper housing 1. The projecting arc portion of movable swash plate 11 is formed as a cradle-type movable swash plate that slides in close contact with the recessed arc portion of the upper housing 1.

Figure 7:
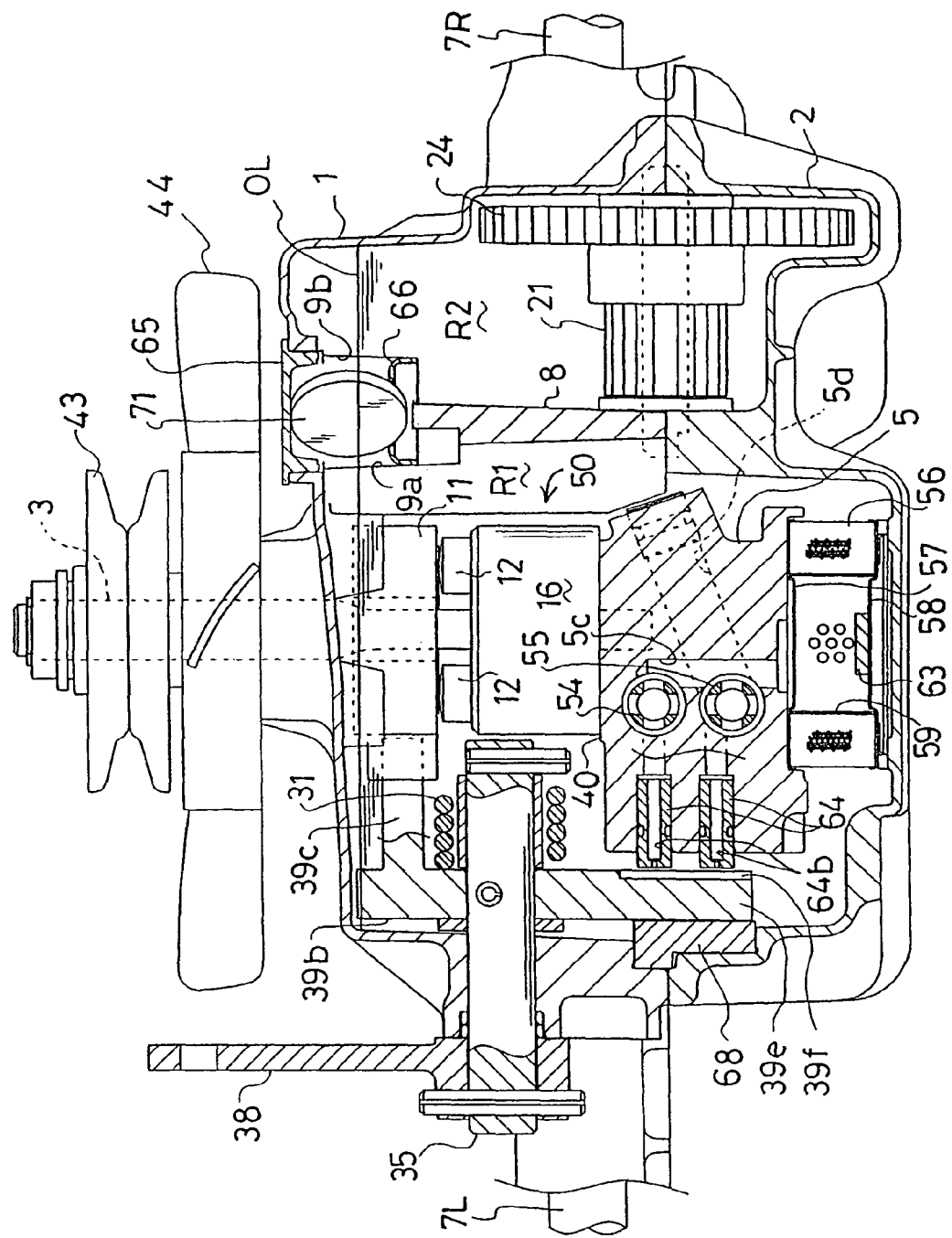
FIG. 7 is a sectional view taken in a direction of an arrow E—E in FIG. 4.

In order to incline the movable swash plate 11, as shown in FIGS. 4 and 7, a control shaft 35 parallel with the axle 7 is rotatably supported on a right wall of the upper housing 1 on an opposite side to the drive train for transmitting power to the differential gear 23. A control arm 38 is mounted to an end portion of the control shaft 35 extending to an outside of the housing and a swinging arm 39 is mounted to a housing inner end portion of the control shaft 35. The swinging arm 39 is formed of a first arm 39a and a second arm 39b extending radially from the control shaft 35 and a contact plate 39e formed into a shape of a sector.

The contact plate 39e extends to a vicinity of an end face of the horizontal portion of the center section 5 in the lower housing 2 and forms a sector-shaped contact face around an axial center of the control shaft 35 such that the contact plate 39e can be in contact with piston bodies 64, 64 which will be described below in an entire range covered when the control lever 38 is rotated from a neutral position to a forward-side maximum position and a rearward-side maximum position as shown in FIG. 7. The contact plate 39e may be formed as a separate member independent of the control arm 39 if the contact plate 39e rotates with the control arm 39.

A projection 39c is formed at a tip end portion of the second arm 39b. Because the axial center of the control shaft 35 is aligned with a center of inclining of the movable swash plate 11, it is possible to directly engage the projection 39c with a groove portion formed in aside face of the movable swash plate 11. The control arm 39 is connected to a speed change operating tool (not shown) such as a lever and a pedal provided to the vehicle through a linkage (not shown).

With the above structure, when the control arm 38 is rotated along the longitudinal direction of the bodywork, the swinging arm 39 rotates in the longitudinal direction of the bodywork about the control shaft 35 to incline the movable swash plate 11, thereby changing output of the hydraulic pump 50.

An engaging pin 39d is formed to project from a tip end of the first arm 39a (FIG. 4). A neutral position recovering spring 31 of a helical torsion spring type is fitted to an outside of the control shaft 35 in the housing. Opposite ends of the neutral position recovering spring 31 cross and extend toward the first arm 39a. The opposite end portions of the neutral position recovering spring 31 pinch an eccentric shaft 33 mounted to an inner wall of the upper housing 1 in the vicinity of the control shaft 35 and the engaging pin 39d between the opposite end portions.

Therefore, when the control arm 38 is rotated to rotate the swinging arm 39 in order to change speed, one end side of the neutral position recovering spring 31 is moved away from the other end side of the neutral position recovering spring 31 by the engaging pin 39d while the other end side is stopped by the eccentric shaft 33, thereby applying biasing force for recovering the neutral position to the control lever 38. If operating force applied to the control arm 38 is cancelled, the engaging pin 39d is retained in a neutral position determined by the eccentric shaft 33 by the recovering force generated on the one end side of the neutral position recovering spring 31. A portion of the eccentric shaft 33 extending to the outside of the housing is formed into an adjusting screw. By arbitrarily rotating and displacing the eccentric shaft 33 through the screw portion, the swinging arm 39 is displaced about the control shaft 35 through the neutral position recovering spring 31 and it is possible to adjust the movable swash plate 11 such that the movable swash plate 11 is positioned in the accurate neutral position.

Figure 8:
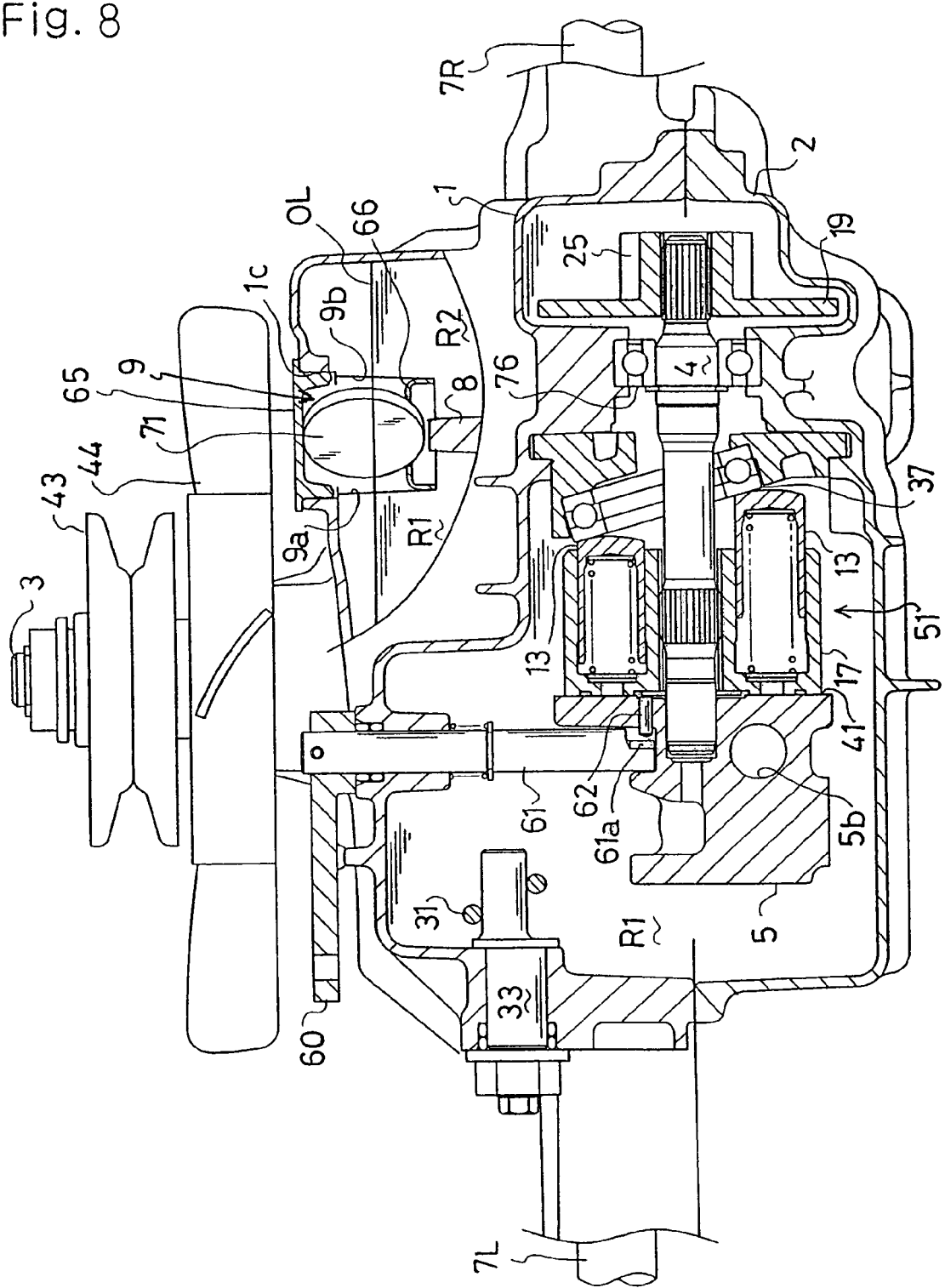
FIG. 8 is a sectional view taken in a direction of an arrow F—F in FIG. 4.

Pressure oil discharged from the hydraulic pump 50 is sent to the hydraulic motor 51 through an oil path in the center section 5. A structure of the hydraulic motor 51 is shown in FIGS. 4 and 8. A cylinder block 17 is disposed for rotation and sliding on the motor attachment face 41 formed on the vertical face of the center section 5. A plurality of pistons 13, 13, are fitted for reciprocating in a plurality of cylinder bores of the cylinder block 17 through biasing springs. Head portions of the pistons 13, 13 are in contact with a fixed swash plate 37. The fixed swash plate 37 is sandwiched and fixed between the upper housing 1 and the lower housing 2.

Figure 5:
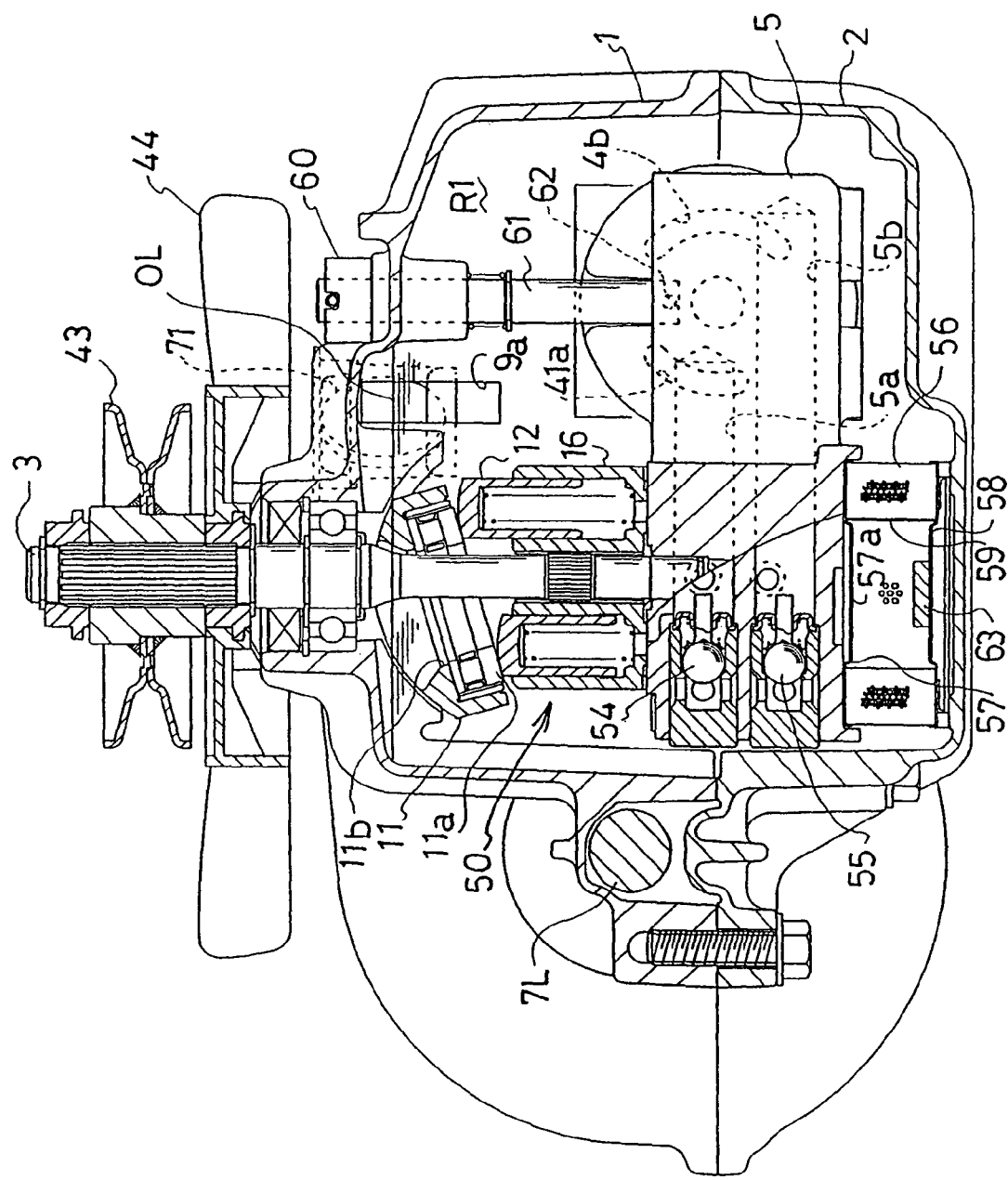
FIG. 5 is a sectional view taken in a direction of an arrow C—C in FIG. 4.

A pair of arcuate ports (not shown) open at the pump attachment face 40 of the horizontal portion of the center section 5 such that supplied or discharged oil from the cylinder block 16 can be introduced through the ports. As shown in FIG. 5, a pair of arcuate ports 41a and 41b also open on the motor attachment face 41 of the vertical portion such that supplied or discharged oil from the cylinder block 17 can be introduced through the ports.

In a thick-walled portion of the center section 5, a straight first oil path 5a and a straight second oil path 5b are formed in parallel with each other in upper and lower positions for respectively connecting the arcuate ports on the pump attachment face 40 and the arcuate ports 41a and 41b on the motor attachment face 41. One of the arcuate ports on the pump attachment face 40 communicates with the oil path 5d formed in a diagonal direction shown in FIG. 7 and the oil path 5d communicates with the second oil path 5b. These oil paths constitute a closed circuit for circulating the hydraulic oil between the hydraulic pump 50 and the hydraulic motor 51. As shown in FIGS. 5 and 7, check valves 54 and 55 are disposed at front end portions of the first oil path 5a and second oil path 5b in their extending direction. Also, an oil hole 5c that communicates with both the check valves 54 and 55 and opens downward at a lower face of the center section is provided to a primary side (front portion) of the check valves 54 and 55 such that the check valves 54 and 55 automatically open only in supplying the hydraulic oil.

As shown in FIG. 7, piston bodies 64, 64 constituting means for lessening a shock in recovering of the neutral position are arranged in a vertical direction at oil path ends formed perpendicularly to the first oil path 5a and second oil path 5b. Each piston body 64 has a cylindrical shape and is formed at an axial center portion with an orifice 64b to open the oil paths 5a and 5b to an outside of the closed circuit through the orifice 64b. In other words, when the control arm 39 is in the neutral position, straight and vertical groove portions 39f each having a width slightly larger than a diameter of each of ends of the orifices 64b, 64b are formed on the contact plate 39e that faces the orifices 64b, 64b of the piston bodies 64, 64 and open at the lower face of the contact plate 39e.

By the groove 39f, the closed circuit is allowed to communicate with an oil reservoir within the housing through the orifices 64b, 64b. By rotating the control arm 39 such that the movable swash plate is inclined through an angle greater than a predetermined angle from the neutral position, the orifices 64b, 64b and the groove portions 39f, 39f are separated from each other. A surface of the contact plate 39e excluding the groove portions 39f, 39f and facing the orifices 64b, 64b is formed to be smooth and a friction plate 68 is disposed at a portion facing the orifices 64b, 64b through the contact plate 39e and is sandwiched and fixed between the upper housing 1 and the lower housing 2. As described below, if the piston bodies 64, 64 advance while receiving hydraulic pressure, the contact plate 39e is sandwiched between the piston bodies 64, 64 and the friction plate 68, thereby applying rotational resistance to the contact plate 39e.

In such a structure, if the speed change operating tool of the vehicle is operated to rotate the control lever 38 of the axle driving system, the control arm 39 is rotated through the control shaft 35, the engaging projection 39c is engaged with the engaging groove of the movable swash plate 11 to incline the movable swash plate 11, the discharge amount of the hydraulic oil of the hydraulic pump is changed, and a rotation number of the motor shaft 4 of the hydraulic motor is changed according to a rotation direction and a rotation amount of the speed change operating tool to transmit power to the axle 7.

At this time, pressure proportional to load of the axle 7 is applied to the higher-pressured oil, i.e., the first oil path 5a or the second oil path 5b and one of the piston bodies 64 is slid outward by this pressure to push the contact plate 39e of the control arm 39. Friction force generated by the pushing force is set at a smaller value than the spring force of the neutral position recovering spring 31. An operator operates the speed change operating tool with operating force that exceeds the friction force and the spring force. Because the orifice 64b of the piston body 64 is closed by the smooth face of the contact plate 39e after inclining the movable swash plate through the predetermined angle, the hydraulic oil circulating through the closed circuit does not leak from the orifice 64b and the volumetric efficiency of the HST is maintained satisfactorily.

In such a state, if the operator releases the operating force applied to the speed change operating tool, the control arm 39 is biased by the spring force of the neutral position recovering spring 31 such that the control arm 39 rotates toward the neutral position. However, as described above, because the friction force is generated between the piston body 64 and the contact plate 39e of the control arm 39, resistance is applied to the rotation toward the neutral position and the control arm 39 gradually rotates toward the neutral position. Thus, sudden dynamic braking is not applied and a quick stop is not generated. When the control arm 39 rotates to the vicinity of the neutral position, the orifice 64 of the piston body 64 communicates with the groove portion 39f of the control arm 39, pushing pressure applied to the contact plate 39e and residual pressure in the closed circuit are allowed to escape, a shock of stop is lessened, and a neutral range of the HST is widened.

A bypass operating lever 60 for causing the first oil path 5a and second oil path 5b open into the oil reservoir is disposed at an upper portion of the upper housing 1 such that the axle can be freewheeling in tow. In other words, as shown in FIGS. 5 and 8, a base portion of the bypass operating lever 60 is fixed to an upper end of a bypass shaft 61 axially supported for rotation in a vertical direction by an upper wall of the upper housing 1 and a lower end of the bypass shaft 61 extends along one side face of a vertical portion of the center section 5. A pushing pin 62 that can come in contact with a rotating sliding face of the cylinder block 17 supported on the other side face of the vertical portion is slidably supported in the vertical portion. An end face of the pushing pin 62 is brought into contact with a flat face 61a formed on a side face of the lower end of the bypass lever shaft 61.

Therefore, if the operator operates the bypass operating lever 60 on the outside of the housing in tow of the vehicle, the bypass lever shaft 61 is rotated, the flat face 61a at the lower end of the bypass lever shaft 61 inclines to push the pushing pin 62 toward the cylinder block 17, the pushing pin 62 separates the motor attachment face 41 and the cylinder block 17 which have been in close contact with each other, and the first oil path 5a and second oil path 5b open into the oil reservoir of the housing through the arcuate ports 41a and 41b, thereby allowing the motor shaft 4 to rotate freely.

An annular oil filter 56 is disposed between a lower face of the center section 5 and an inner bottom face of the lower housing 2 such that a periphery of an opening portion at a lower end of the oil hole 5c is covered with the oil filter 56. The oil filter 56 is formed by sandwiching a ring-shaped porous member that is a filter main body between upper and lower cover plates 57 and 58 and disposing a cylindrical support cylinder 59 such as net or punching metal at an inner peripheral face portion of the porous member as shown in FIGS. 5 and 7. Because an opening 57a is formed at a center portion of the upper cover plate 57, filtered oil that has flowed from an outer peripheral portion of the oil filter 56 into an inside of the oil filter 56 can flow into the oil hole 5c of the center section 5 through the opening 57a.

The cover plates 57 and 58 are formed of a steel sheet such as an iron sheet and a nickel sheet which can be magnetized and a magnet 63 is placed on an upper face of an inner face of the lower cover plate 58 to magnetize the lower cover plate 58. In this manner, iron powder included in the reservoir of the first room R1 is collected by the lower cover plate 58 and even extremely fine iron powder that has passed through the oil filter 56 is collected by the magnet 63 or the lower cover plate 58 and is not introduced into the closed circuit, thereby preventing damaging of the sliding face and the like.

A position where the magnet 63 is disposed is not limited to the upper face of the lower cover plate 58 and the magnet 63 may be also disposed on a lower face of the lower cover plate 58 or at the upper cover plate 57. If the magnet 63 is disposed at the upper cover plate 57, it is necessary to provide a bridge, a mount, or the like such that the magnet 63 can be hung within the oil filter 56.

Figure 9:
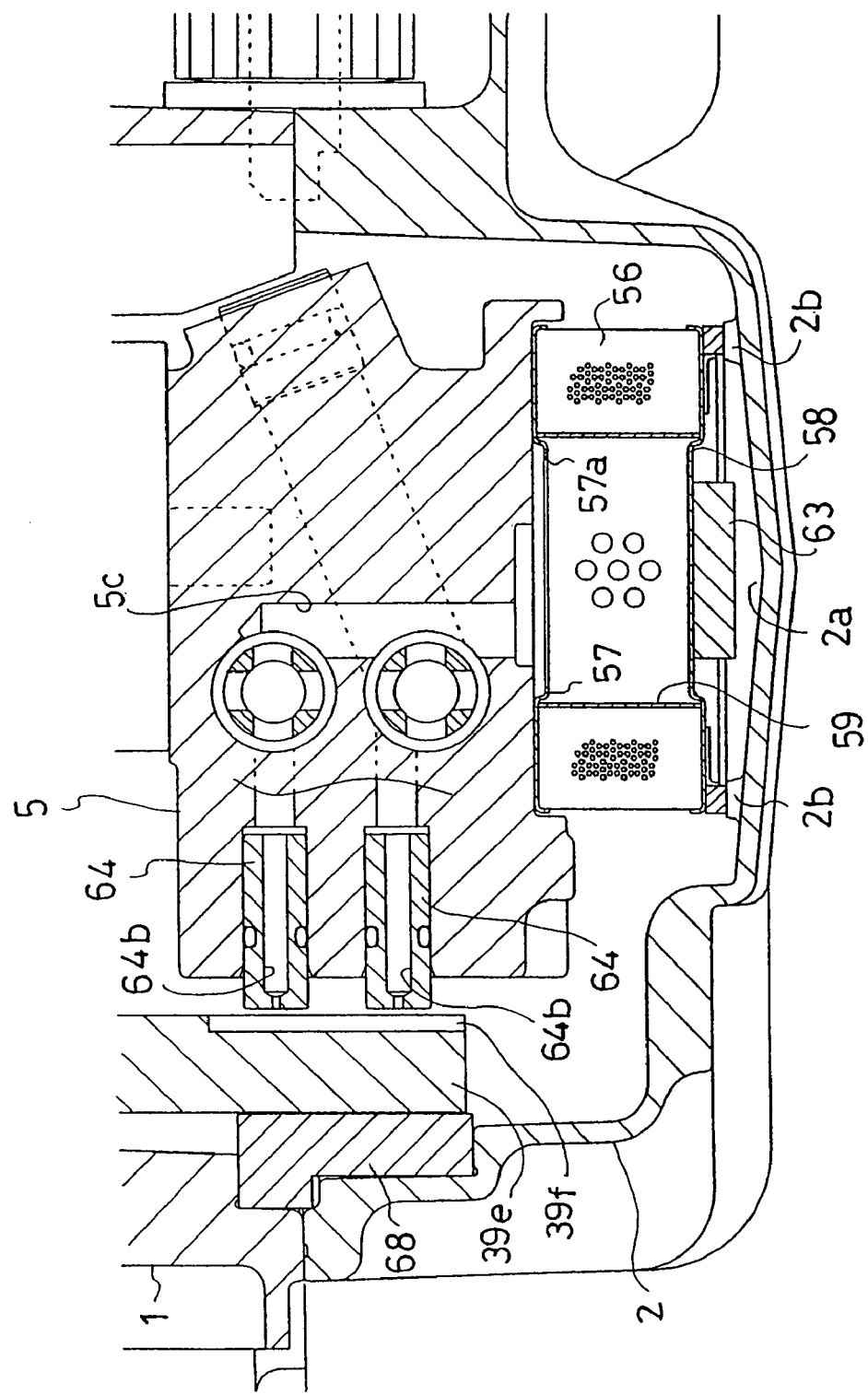
FIG. 9 is a sectional view showing another embodiment in which a magnet is disposed in the vicinity of an oil filter.

If the magnet 63 is provided to the lower face of the lower cover plate 58, as shown in FIG. 9, a depression or a recessed portion 2a is formed at the lower housing 2 at a lower portion where the oil filter 56 is positioned to form a space where dust and the like accumulate. Three or more projections 2b, 2b, are formed on an inner face of the lower housing 2 in peripheral positions of the space where the oil filter 56 is positioned and the lower face of the lower cover plate 58 is placed on the projections 2b, 2b, thereby supporting the oil filter 56.

Thus, a passage is formed by the projections 2b, 2b, between the lower cover plate 58 and the bottom face of the lower housing 2 and between the projections 2b, 2b, dust and the like pass through the passage and accumulate in the recessed portion 2a that is less subject to flow of oil when the oil is stirred, and the iron powder is collected by the magnet 63. By the projections 2a, 2a, the lower cover plate 58 is disposed in a higher position, thereby forming a space where the magnet 63 is disposed.

Furthermore, if there is extremely fine iron powder that has passed through the oil filter 56, the iron powder is collected by an upper face of the lower cover plate 58 because the lower cover plate 58 is magnetized by the magnet 63.

The motor shaft 4 is locked onto a rotation axial center of the cylinder block 17 such that the motor shaft 4 cannot rotate with respect to the cylinder block 17. The hydraulic motor shaft 4 is oriented in a substantially horizontal direction. One end of the motor shaft 4 is supported in a bearing hole in the motor attachment face 41 of the center section 5, the other side of the motor shaft 4 is supported through a bearing 76 on the inner wall 8 formed at the joint face between the upper housing 1 and the lower housing 2, and a tip end projects into the second room R2. A bearing with a seat is used as the bearing 76 so as to separate the first room R1 and the second room R2.

Figure 6:
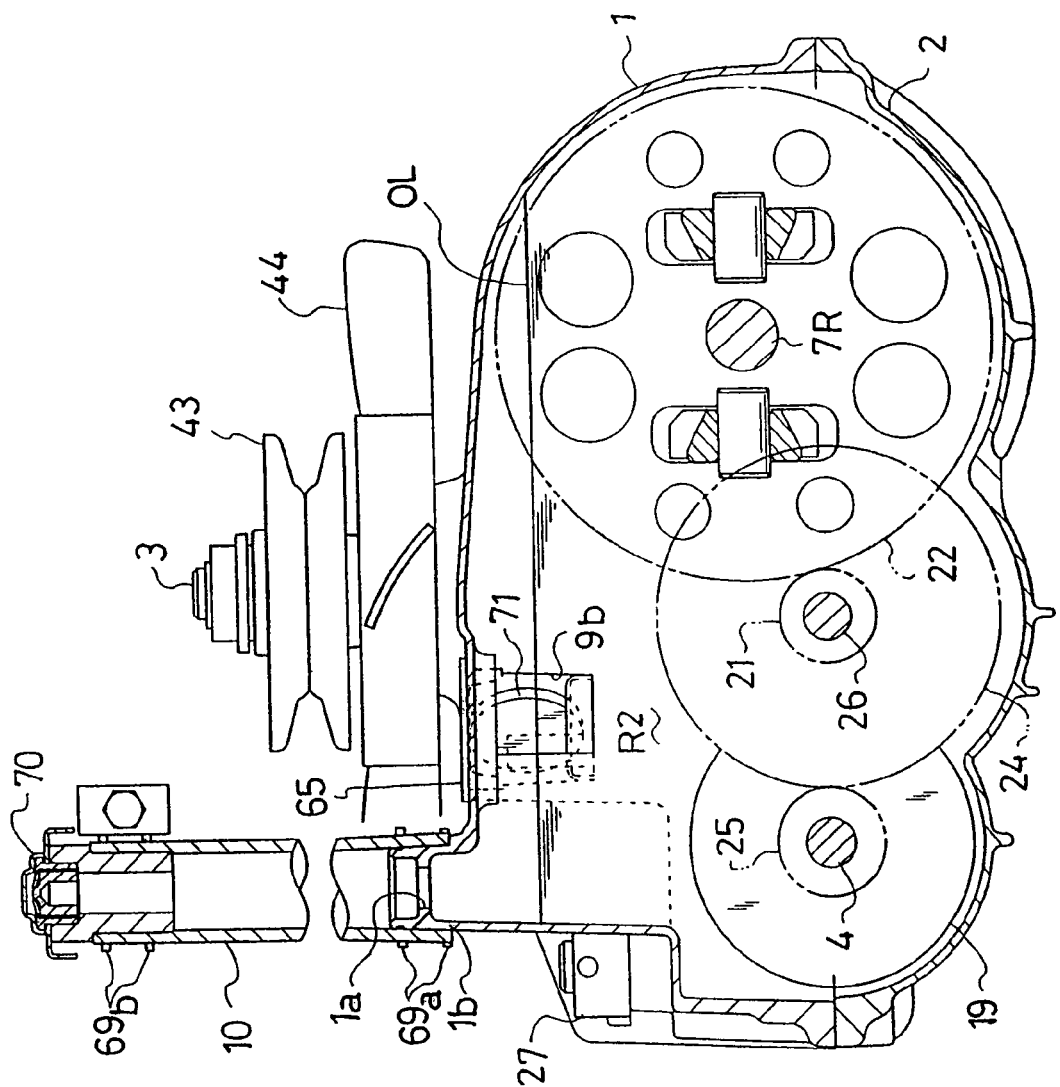
FIG. 6 is a sectional view taken in a direction of an arrow D—D in FIG. 4.

The drive train for transmitting power from the motor shaft 4 to the differential gear system 23 is formed of a gear 25 secured onto the motor shaft 4 projecting into the second room R2, a large-diameter gear 24 that constantly meshes with the gear 25 and is supported on the counter shaft 26, a small-diameter gear 21 supported on the counter shaft 26 rotating with the large diameter gear 24, and a ring gear 22 of the differential gear 23 with which the small-diameter gear 21 constantly meshes as shown in FIGS. 4 and 6. The counter shaft 26 is disposed within the second room R2 to be adjacent to and orthogonal to the pump shaft 3.

One end of the counter shaft 26 is supported on a side wall of the housing, i.e., at the joint face between the upper housing 1 and the lower housing 2 and the other end of the counter shaft 26 is supported on the inner wall 8 of the housing, i.e., at the joint face between the upper housing 1 and the lower housing 2. Speed of rotation output from the motor shaft 4 is reduced by the large-diameter gear 24, the small diameter gear 21, and the ring gear 22 to drive the axles 7L and 7R through the differential gear 23.

A brake disc 19 formed integrally with the gear 25 is secured onto a tip end portion of the motor shaft 4 positioned within the second room R2. As shown in FIG. 4, a brake pad 29 is disposed between a rear side of an upper portion of the brake disc 19 and an inner face of the upper housing 1 and a pressing body 72 and a brake operating shaft 14 are disposed successively with respect to the brake disc 19 in a portion surrounded by the brake disc 19 and the inner wall 8 of the housing on a side (right side of the brake disc 19) of the brake disc 19 opposite to the brake pad 29.

The brake operating shaft 14 is disposed in a vertical direction and supported rotatably by the upper housing 1 and the lower housing 2. An upper end of the brake operating shaft 14 projects upward from the housing and a brake arm 27 (FIG. 3) is fixed to the upper end. A flat notch 14a is formed on an outer face of a midway portion of the brake operating shaft 14 within the housing such that the operating shaft 14 has a D shape in a plan sectional view, the pressing body 72 is brought into contact with the notch 14a, movement of the pressing body 72 in rightward and leftward directions is limited by the notch 14a, and front and rear opposite sides of the pressing body 72 are guided by the inner face of the upper housing I such that the pressing body 72 can slide only in leftward and rightward directions. Therefore, if the brake arm 27 is rotated, the brake operating shaft 14 is rotated, an end portion of the notch 14a pushes a back face of the pressing body 72, and the brake disc 19 is sandwiched between the brake pad 29 and the pressing body 72 to brake the motor shaft 4.

The first room R1 and the second room R2 are filled with common lubricating oil to form the oil reservoir. As shown in FIGS. 4 to 8, a communicating room 9 is formed at an upper portion of the inner wall 8 that partitions the inside of the housing into the first room R1 and the second room R2. An oil inlet 9a communicating with the first room R1 and an oil inlet 9b communicating with the second room R2 open into a side face and a bottom of the communicating room 9. An opening portion 1c, to which a filter member that will be described below is mounted, is formed at the upper housing above the oil inlets, and the opening portion 1c is closed by a lid 65.

Figure 10:
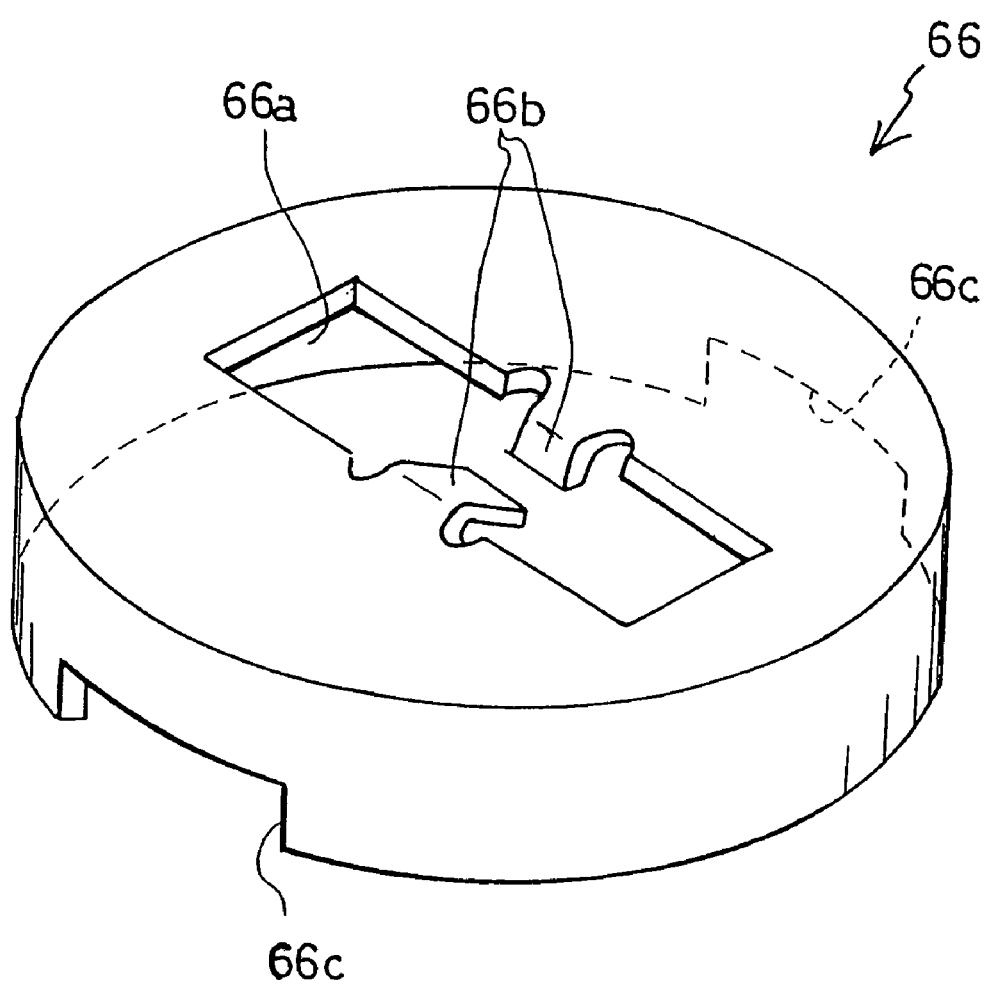
FIG. 10 is a perspective view of a mounting seat.

A mounting seat 66 formed by press forming an iron sheet into a cup shape is placed on a bottom face of the communicating room 9 and a magnet 71 as a filter member for removing impurities is placed and fixed onto the mounting seat 66. The magnet 71 is formed into a disc shape, and as shown in FIG. 10, an elongated hole 66a is formed on an upper face of the mounting seat 66. By inserting the magnet 71 into the elongated hole 66a and bringing tongue chips 66b extending from opposite sides of the elongated hole 66a to face each other into resilient contact with opposite faces of the magnet 71, the magnet 71 and the mounting seat 66 are integrated with each other. The integrated magnet 71 and mounting seat 66 are inserted into the communicating room 9 that opens at an upper wall of the upper housing 1 and the opening is closed by the lid 65, thereby achieving completion.

A reference numeral 66c in FIG. 10 designates notches, each formed by partially notching a lower end face of the mounting seat 66. A width of the notch 66c is equal to a thickness of a portion of the inner wall 8 positioned at the bottom face of the communicating room 9. By inserting the portions of the inner wall 8 into the notches 66c when the mounting seat 66 is placed on the bottom face of the communicating room 9, rotation of the magnet 71 within the communicating room can be prevented.

The magnet 71 is fixed such that the magnet 71 is oriented to be diagonal with respect to the oil inlets 9a and 9b so as to increase a contact area in flowing of the oil. However, the magnet 71 may have a rectangular shape and a shape of the magnet 71 is not limited.

With the above structure, iron powder generated in the first room R1 and the second room R2 when the oil within the housing circulates between the first room R1 and the second room R2 is attracted by the magnet 71 and adheres to the magnet 71 and the mounting seat 66 to maintain the oil that has accumulated in the first room R1 in a clean state, thereby improving durability of the HST.

As shown in FIGS. 2 and 6, an oil circulating hole 1a opens at the upper wall face of the upper housing 1 forming the second room R2 in a position where the hole does not interfere with the input pulley 43 and the cooling fan 44. A joint pipe portion 1b is formed on a periphery of the oil circulating hole 1a. A tubular reservoir tank 10 formed of a rubber hose or a resilient member is fitted with the joint pipe portion 1b such that the reservoir tank 10 communicates with the second room R2 in a fluidic manner. A lower portion of the reservoir tank 10 is fastened and fixed by the joint pipe portion 1b and bands 69a. An opening at an upper end of the reservoir tank 10 is closed by a breather cap 70 and fastened and fixed by bands 69b.

If the first and second rooms R1 and R2 are filled with oil after assembling the axle driving system, an oil level OL is determined within both the rooms R1 and R2 as shown in FIGS. 5 to 8. The oil level OL is uniform because both the rooms R1 and R2 communicate with each other through the communicating room 9. If a volume of the oil within the first room R1 varies depending on whether the HST is driven, the oil level OL shifts upward or downward from the position shown in the drawings. An air layer with a variable volume is formed above the oil level OL within the reservoir tank 10 that opens into the atmosphere through the breather cap 70. The air layer allows variation in the volume of the oil.

Thus, the hydraulic oil expands and the volume of the hydraulic oil increases when a temperature of the hydraulic oil within the oil reservoir increases due to driving of the HST. The volume can be adjusted by causing the increase in the volume to flow into the reservoir tank 10 and a vertical length of the tube portion of the reservoir tank 10 is set at such a value as to keep at least a volume corresponding to an oil amount by which the volume of the housing increases.

The reservoir tank 10 can be easily mounted by only inserting the reservoir tank 10 in to the joint pipe portion 1*b* on the outer wall of the housing and fastening the reservoir tank 10 by the band 69*a*. As shown in FIG. 2, if the chute 106 and the like exist above the housing, the reservoir tank 10 can be bent naturally to make way for the chute 106 and the like because of resiliency of the reservoir tank 10 itself.

Therefore, it is possible to reduce limitations on disposition of the reservoir tank 10.

As described above, the axle driving system according to the invention is a system suitable for driving an axle of a field-work vehicle, a vehicle of construction equipment, a mowing vehicle, a snow removal vehicle, or the like and especially suitable to a lawn tractor of a rear discharge method having a chute above the housing.

What is claimed is:

1. A mower tractor comprising:
   a hydraulic axle driving apparatus including an oil sump;
   left and right wheels driven by said hydraulic axle driving apparatus;
   a chute for grass clippings disposed between said left and right wheels;
   a transmission belt for driving said axle driving apparatus disposed to one lateral side of said chute; and
   an oil reservoir disposed to the other lateral side of said chute opposite to said transmission belt, wherein said oil reservoir fluidly communicates with the oil sump in said hydraulic axle driving apparatus.

2. A mower tractor comprising:
   an axle driving apparatus;
   a housing for said axle driving apparatus;
   a chute for grass clippings disposed directly above said housing; and
   an oil reservoir for said axle driving apparatus disposed sidewise from said chute so as to avoid abutting against said chute.

3. A mower tractor comprising:
   an engine having an engine output pulley;
   an axle driving apparatus having an input pulley;
   an idler pulley for said axle driving apparatus;
   a belt looped over said engine output pulley, said input pulley and said idler pulley, wherein said belt is disposed to one lateral side of said input pulley; and
   an oil reservoir for said axle driving apparatus disposed to the other lateral side of said input pulley opposite to said belt.

* * * * *

UNITED STATES PATENT AND TRADEMARK OFFICE
CERTIFICATE OF CORRECTION

| | | |
|---|---|---|
| PATENT NO. | : 7,011,182 B2 | Page 1 of 1 |
| APPLICATION NO. | : 10/615913 | |
| DATED | : March 14, 2006 | |
| INVENTOR(S) | : Iida et al. | |

It is certified that error appears in the above-identified patent and that said Letters Patent is hereby corrected as shown below:

On Title Page, Item (63) col. 1, the language reading "continuation of application No. 09/355,764, now Pat. No. 6,401,869" should read --continuation of application No. 09/355,764, filed as application No. PCT/JP98/04598 on Oct. 12, 1998, now Pat. No. 6,401,869--.

Please insert the following language after section (63) and before section (51) of the Title Page:

--Foreign Application Priority Data--

--October 8, 1998 (JP) …………….. 10-286468--

Signed and Sealed this

Fifth Day of September, 2006

JON W. DUDAS
*Director of the United States Patent and Trademark Office*